(12) United States Patent
Kamada (10) Patent No.: US 7,585,240 B2
(45) Date of Patent: Sep. 8, 2009

(54) BICYCLE SPROCKET ASSEMBLY

(75) Inventor: Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 700 days.

(21) Appl. No.: 11/048,712

(22) Filed: Feb. 3, 2005

(65) Prior Publication Data

US 2006/0172840 A1 Aug. 3, 2006

(51) Int. Cl.
*F16H 55/12* (2006.01)
*F16H 55/30* (2006.01)

(52) U.S. Cl. .................... 474/160; 474/152; 474/148; 474/164

(58) Field of Classification Search .............. 474/148, 474/152, 160, 164
See application file for complete search history.

(56) References Cited

U.S. PATENT DOCUMENTS

| | | | |
|---|---|---|---|
| 2,451,691 A | 10/1948 | Oehler | |
| 4,594,910 A | 6/1986 | Nagano | |
| 5,194,051 A | 3/1993 | Nagano | |
| 5,213,550 A * | 5/1993 | Wu | 474/160 |
| 5,503,600 A * | 4/1996 | Berecz | 474/160 |
| 5,935,034 A | 8/1999 | Campagnolo | |
| 6,102,821 A | 8/2000 | Nakamura | |
| 6,176,798 B1 | 1/2001 | Nakamura | |
| 6,264,575 B1 * | 7/2001 | Lim et al. | 474/77 |
| 6,340,338 B1 | 1/2002 | Kamada | |
| 6,382,381 B1 * | 5/2002 | Okajima et al. | 192/64 |
| 6,428,437 B1 * | 8/2002 | Schlanger | 474/160 |
| 6,488,603 B2 * | 12/2002 | Lim et al. | 474/160 |
| 6,866,604 B2 * | 3/2005 | Kamada et al. | 474/160 |
| 2004/0070166 A1 | 4/2004 | Valle | |
| 2004/0121867 A1 | 6/2004 | Reiter | |
| 2009/0098966 A1 * | 4/2009 | Kamada | 474/160 |

FOREIGN PATENT DOCUMENTS

| | | |
|---|---|---|
| DE | 10342638 A1 | 4/2005 |
| DE | 202004019270 U1 | 4/2005 |
| EP | 0510371 A1 | 10/1992 |
| EP | 0765802 A2 | 4/1997 |
| EP | 1074462 B1 | 2/2001 |
| EP | 1431172 A2 | 6/2004 |
| JP | S59-165293 U | 11/1984 |

* cited by examiner

*Primary Examiner*—Robert A Siconolfi
*Assistant Examiner*—Thomas W Irvin
(74) *Attorney, Agent, or Firm*—Global IP Counselors, LLP (57) ABSTRACT

A bicycle sprocket assembly has two or more sprockets in which a chain is shifted between adjacent pairs of the sprockets. Each sprocket includes a chain engaging portion with a plurality of teeth and an attachment portion. At least one of the larger sprockets has a plurality of space maintaining projections extending axially towards an adjacent one of the sprockets. In a preferred embodiment, a predetermined axial space exists between a free end of each of the space maintaining projections and the adjacent one of the sprockets.

21 Claims, 8 Drawing Sheets

BICYCLE SPROCKET ASSEMBLY

BACKGROUND OF THE INVENTION

1. Field of the Invention

This invention generally relates to multiple sprocket assemblies for bicycles. More specifically, the present invention relates to a multiple sprocket assembly that is configured to maintain proper spacing between adjacent sprockets.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to meet the demands of the riders.

In recent years, as the number of speeds available in bicycle transmissions has increased, the number of sprockets installed on the rear-wheel sprocket assembly of such bicycles has increased seven sprocket wheels or more. As a result, the weight of the bicycle has increased. Thus, there is a desire to reduce the weight of the bicycle. In other words, in pursuit of faster running speed, it is desirable to reduce the weight of all kinds of parts of the bicycle.

In order to reduce the weight of a multiple sprocket assembly, a spider (sprocket support), which supports a plurality of ring-shaped sprocket wheels, has been proposed. By using a spider, a light metal such as aluminum, etc., is generally used for the spider, while various types of steel materials are used for the sprockets to provide adequate strength. One example of a multiple sprocket assembly that uses a spider is disclosed in U.S. Pat. No. 6,102,821 (assigned to Shimano Inc.). In this patent, two spiders are used with each spider supporting two sprockets. Each spider has a boss part and a plurality of support arms which extend radially outward from the outer circumferential surfaces of the boss part in directions perpendicular to the axis of the boss part. The sprockets are attached to mounting surfaces on opposite side surfaces of each of the support arms. Accordingly, this construction is greatly improved in terms of weight reduction.

However, one drawback of a multiple sprocket assembly unit constructed in this manner is that if the spider is made too thin, then the sprocket may deflect towards the adjacent sprocket. This situation can result in degrading the shifting performance of the rear derailleur.

In view of the above, it will be apparent to those skilled in the art from this disclosure that there exists a need for an improved bicycle sprocket assembly. This invention addresses this need in the art as well as other needs, which will become apparent to those skilled in the art from this disclosure.

SUMMARY OF THE INVENTION

One object of the present invention is to provide a bicycle sprocket assembly which is relatively lightweight, strong and resist deflection of the sprockets during shifting of the chain from one sprocket to the adjacent sprocket.

Another object of the present invention is to provide a bicycle sprocket assembly which is relatively easy and inexpensive to manufacture.

The foregoing objects can basically be attained by providing a bicycle sprocket assembly that basically comprises a first sprocket and a second sprocket. The first sprocket includes a first mounting portion with a first radially innermost end and a first chain engaging portion with a plurality of first teeth. The second sprocket includes a second mounting portion with a second radially innermost end and a second chain engaging portion with a plurality of second teeth that are fewer in total number than a total number of the first teeth of the first sprocket. At least one of the first and second sprockets has a plurality of space maintaining projections extending axially towards an adjacent one of the first and second sprockets to limit relative deflection between the first and second sprockets, with the space maintaining projections being located radially outwardly of the first and second radially innermost ends of the first and second mounting portions of the first and second sprockets.

These objects and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
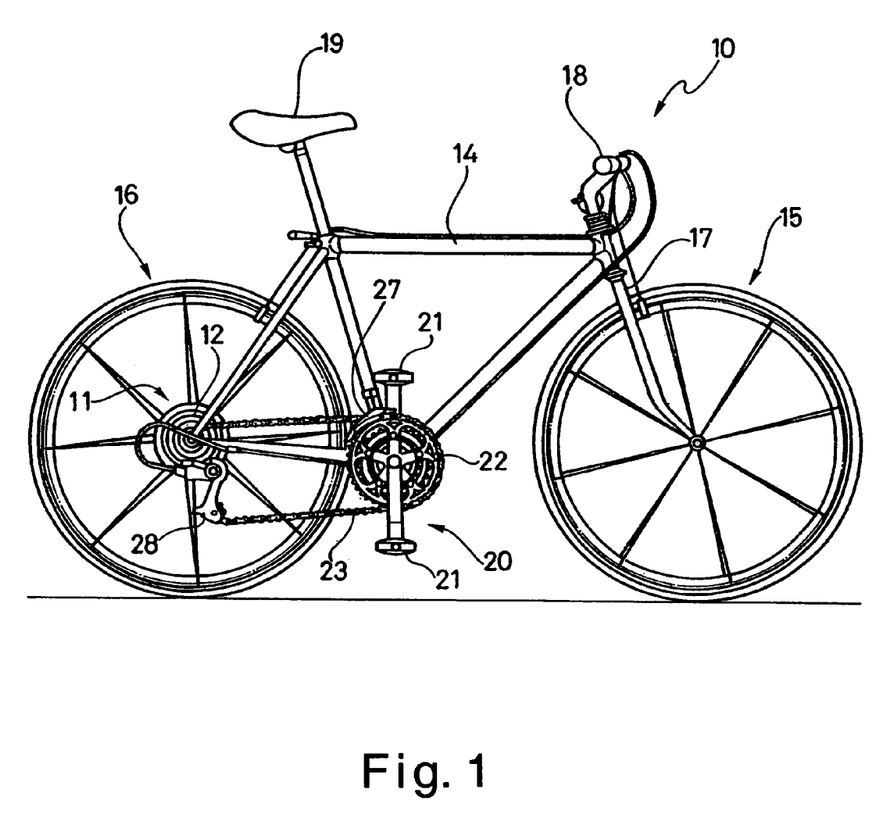
FIG. 1 is a side elevational view of a bicycle having a rear wheel with a bicycle sprocket assembly in accordance with a first embodiment of the present invention.
Figure 2:
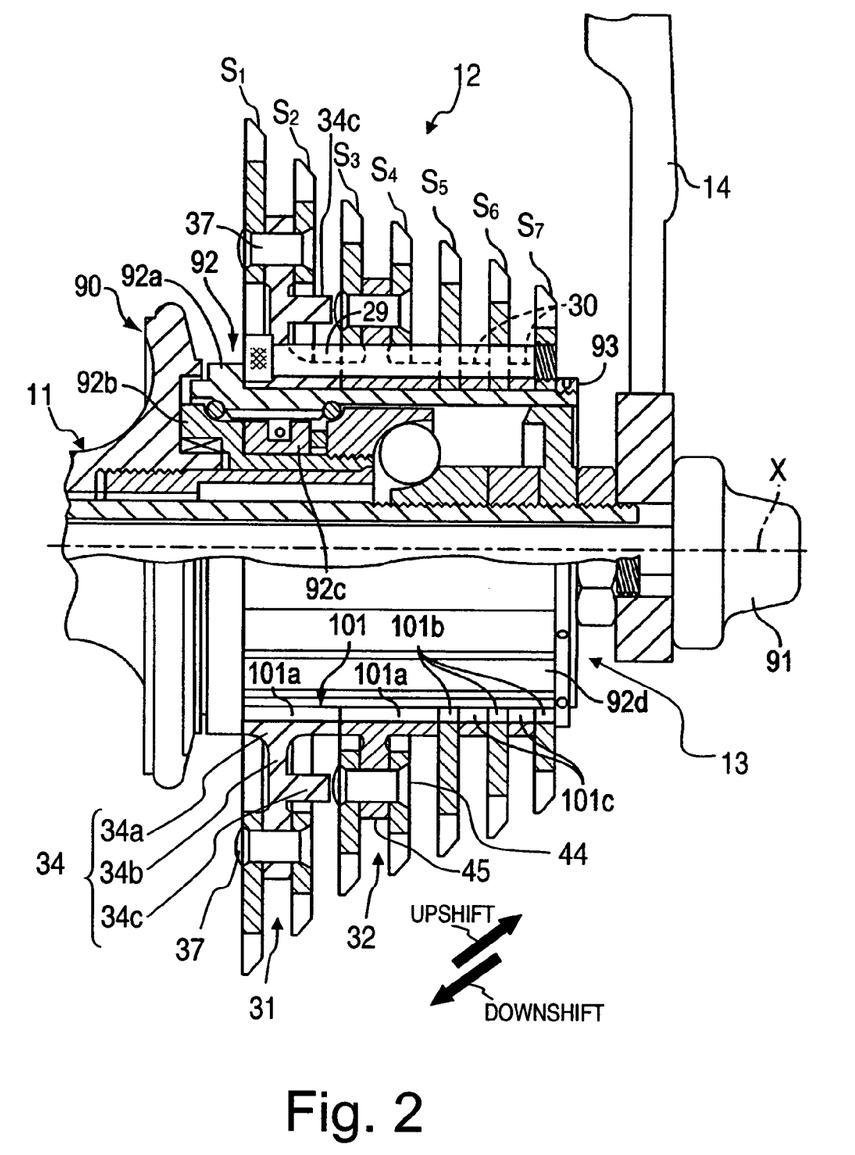
FIG. 2 is a partial cross-sectional view of the rear hub with the multiple sprocket assembly in accordance with the first embodiment of the present invention.
Figure 3:
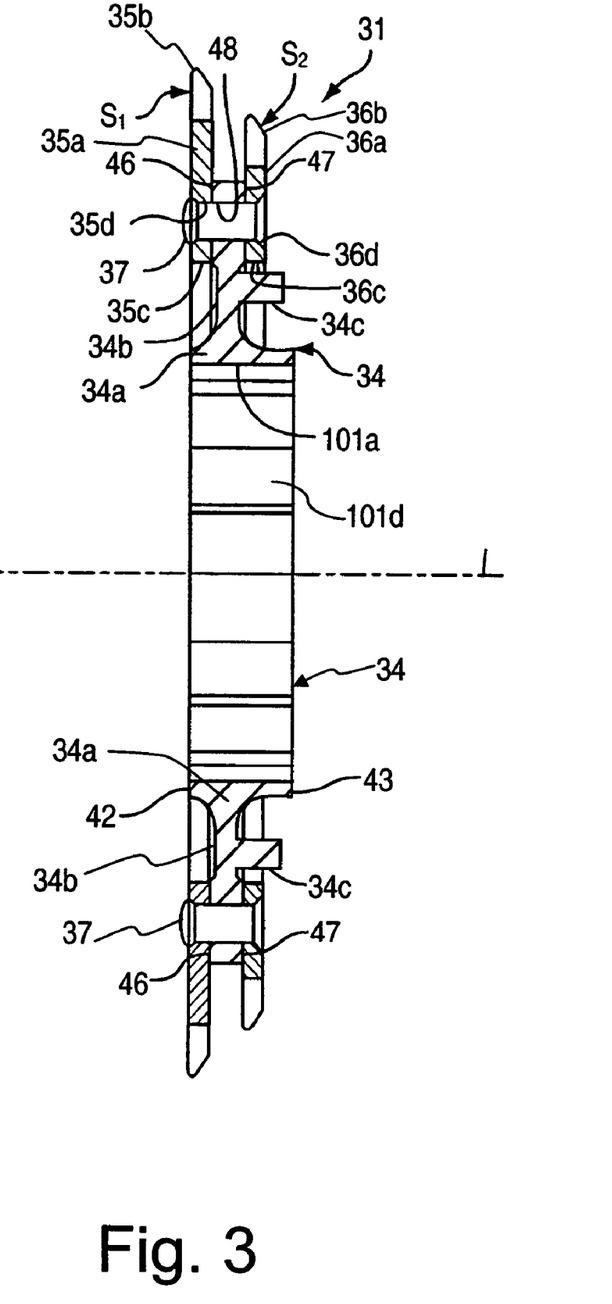
FIG. 3 is a cross sectional view of one of the sprocket subassemblies shown in FIG. 1 in accordance with the first embodiment of the present invention.

Referring initially to FIGS. 1-3, a conventional bicycle 10 is illustrated having a rear bicycle hub 11 with a rear multi-stage sprocket assembly 12 mounted on a freewheel 13 in accordance with a first embodiment of the present invention. The bicycle 10 basically has a frame 14 with front and rear wheels 15 and 16 rotatably coupled thereto. A front fork 17 is coupled between the frame 14 and the front wheel 15 in a conventional manner. Turning a handlebar 18, which is fixedly coupled to the front fork 17, turns the front wheel 15. The rear wheel 16 is rotatably coupled to a rear portion of the frame 14 via the rear hub 11. The frame 14 also has a seat 19 adjustably coupled to the frame 14 and a drive train 20 for propelling the bicycle 10. The bicycle 10 is conventional except for selected parts of the drive train 20, as discussed below.

The drive train 20 basically includes the rear multi-stage sprocket assembly 12 of the present invention, a pair of pedals 21, a front multi-stage sprocket assembly 22 mounted to rotate with the pedals 21, and a chain 23 extending between the rear multi-stage sprocket assembly 12 and the front multi-stage sprocket assembly 22. As mentioned above, the rear sprocket assembly 12 is preferably coupled to the rear hub 11 via the freewheel 13. The rear multi-stage sprocket assembly 12 in the illustrated embodiment has seven sprockets $S_1$-$S_7$ that are mounted to the freewheel 13 of the rear hub 11 in a conventional manner. The pedals 21 are coupled to the front multi-stage sprocket assembly 22 by a conventional crank set to transfer force from the rider to the chain 23. The force from the chain 23 is then selectively transferred to the rear wheel 16 via the rear hub 11 (e.g. via the rear sprocket assembly 12 and the freewheel 13 depending on the direction of rotation) in a conventional manner.

The drive train 20 is basically controlled by conventional front and rear shifting units (not shown) that control the lateral positions of front and rear derailleurs 27 and 28 in a conventional manner. Thus, when the rider is pedaling, the front and rear sprocket assemblies 22 and 12 are rotating to circulate the chain 23 due to the movement of the pedals 21. The shifting units can be actuated by the rider to control the position of the front and/or rear derailleurs 27 and/or 28. Thus, when the chain 23 is circulated in the forward (clockwise direction as seen in FIG. 1), the shifting units can be actuated to control the gear ratio of the drive train 20 by controlling the lateral position of the chain 23 via the derailleurs 27 and 28. The derailleurs 27 and 28 selectively apply a lateral force F inwardly/outwardly to the chain 23 to cause up/down shifts. The drive train 20 is basically conventional, except for the rear multi-stage sprocket assembly 12. Thus, the drive train 20 will not be discussed and/or illustrated in detail herein, except as related to the rear multi-stage sprocket assembly 12.

Since the various parts of the bicycle 10 and most of the parts of the drive train 20 are well known in the bicycle art, these parts of the bicycle 10 and the drive train 20 will not be discussed or illustrated in detail herein, except as they are modified in accordance with the present invention. Moreover, various conventional bicycle parts such as brakes, additional sprockets, etc., which are not illustrated and/or discussed in detail herein, can be used in conjunction with the present invention.

As used herein, the terms "forward, rearward, above, below, lateral and transverse" refer to those directions of a bicycle in its normal riding position, to which the rear sprocket assembly 12 is attached. Accordingly, these terms, as utilized to describe the rear sprocket assembly 12 in the claims, should be interpreted relative to bicycle 10 in its normal riding position. However, the terms "down shift" and "up shift" as used herein in reference to the rear sprocket assembly 12 should be interpreted to mean a shift from smaller to larger sprocket and from larger to smaller sprocket, respectively, as shown in FIG. 2.

Referring now to FIG. 2, the rear sprocket assembly 12 in accordance with a preferred embodiment of the present invention will now be discussed. In the illustrated embodiment, the rear sprocket assembly 12 is a seven-stage sprocket assembly with sprockets $S_1$-$S_7$ being spaced from each other at predetermined intervals. The sprockets $S_1$-$S_7$ are fixedly mounted on the freewheel 13 of the rear hub 11 in a relatively conventional manner such that the sprockets $S_1$-$S_7$ rotate together about a center hub rotation axis X. The sprockets $S_1$-$S_7$ typically rotate together in a forward rotational direction R (e.g., in a clockwise direction as viewed in FIG. 1) when the rider is pedaling in a forward (clockwise) direction to propel the bicycle 10 in a forward direction as seen in FIG. 1.

It will be apparent to those skilled in the bicycle field from this disclosure that a sprocket assembly in accordance with the present invention can have fewer or more sprockets. In other words, the present invention can be any multi-stage sprocket assembly for a bicycle that uses a derailleur or the like and which includes at least one large sprocket and at least one small sprocket.

Figure 7:
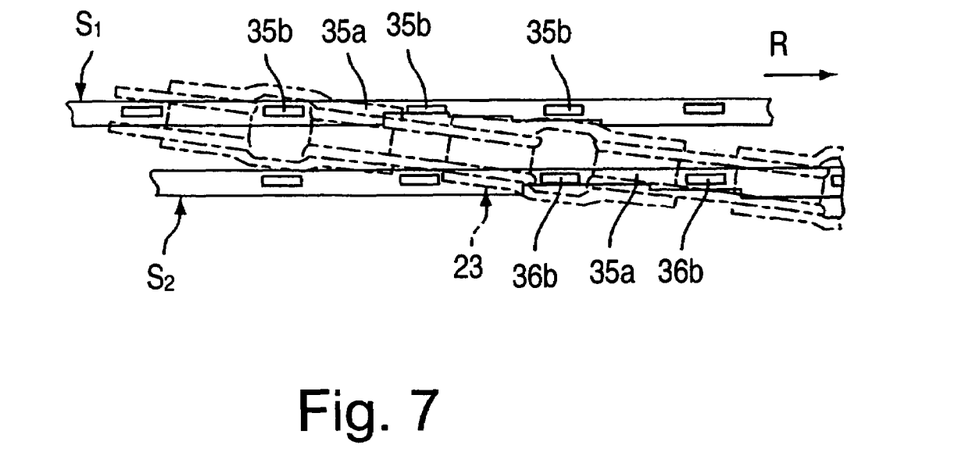
FIG. 7 is a top plan view illustrating shifting of a chain from one sprocket to another in accordance with the first embodiment of the present invention.
Figure 8:
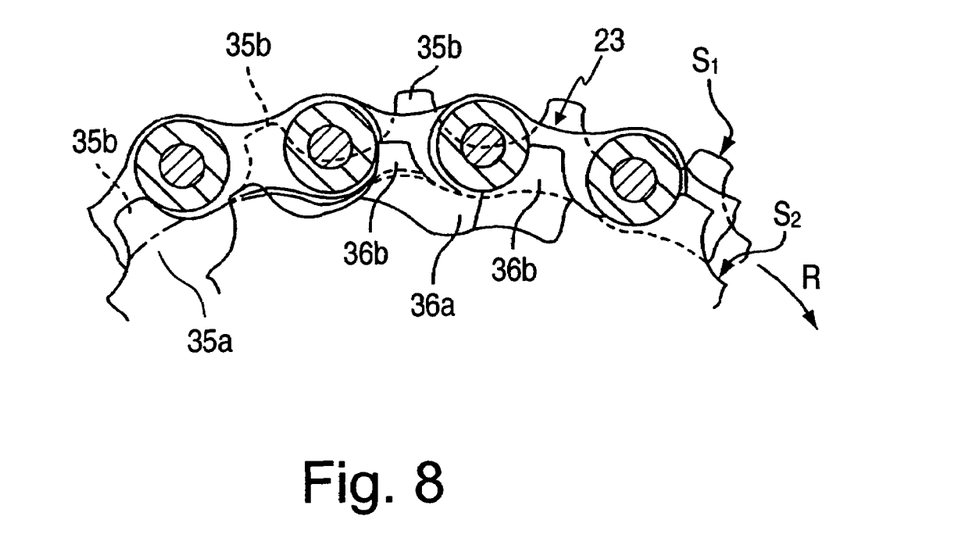
FIG. 8 is a side elevational view illustrating shifting of a chain from one sprocket to another in accordance with a first embodiment of the present invention.

The rear sprocket assembly 12 is adapted to engage with the drive chain 23, which is a conventional style bicycle chain as seen in FIGS. 1, 7 and 8. The drive chain 23 is a continuous loop that has a plurality of inner link plates and a plurality of outer link plates that are pivotally connected to each other by articulation pins and rollers. During a chain shifting process, the chain 23 is shifted from one of the sprocket $S_1$-$S_7$ to the next adjacent sprocket $S_1$-$S_7$ by the rear derailleur 28 moving the chain 23 in an axial direction relative to the axis of rotation X of the sprockets $S_1$-$S_7$ as seen in FIG. 7.

Referring to FIG. 2, the rear sprocket assembly 12 is illustrated in partial cross-section with arrows showing the directions of an up shift and a down shift. An up shift occurs when the chain 23 is moved from a large sprocket to the next smaller sprocket, while a down shift occurs when the chain 23 is shifted from a small sprocket to the next larger sprocket. The sprockets $S_1$-$S_7$ are designed so that the chain 23 can execute smooth down shifting and up shifting motions. Each of the sprockets $S_1$-$S_7$ has a different number of teeth.

In the illustrated embodiment, the sprockets $S_1$-$S_7$ can have either uniform or varying thicknesses as well as uniform or varying axial spaces formed therebetween. In particular, the sprockets $S_1$-$S_7$ typically have thicknesses between about 1.6 millimeters to about 2.2 millimeters, while the sprockets $S_2$-$S_4$ have thicknesses of about 1.8 millimeters. The axial spacing between the sprockets $S_1$-$S_7$ is preferably between about 3.6 millimeters to about 3.9 millimeters, while the axial space between the second sprocket $S_2$ and the third sprocket $S_3$ is preferably about 3.68 millimeters. Spacers are utilized in a relatively conventional manner to create the optimal spacing between the sprockets $S_1$-$S_7$. Thus, the axial spaces between the sprockets $S_1$-$S_7$ can be set to optimize shifting of the chain 23 therebetween. The sprockets $S_1$-$S_7$ are preferably constructed of a lightweight, rigid material such as a metallic material.

As shown in FIG. 2, the sprockets $S_1$-$S_7$ of the rear sprocket assembly 12 are connected by a plurality of connecting fasteners or screws 29 (only one shown). The connecting screws 29 pass through the components in order to form an integral unit. Preferably, the rear sprocket assembly 12 has a pair of ring-shaped spacers 30 installed between the three individual ring-shaped sprockets $S_5$-$S_7$ and two sprocket subassemblies, i.e., a first sprocket subassembly 31 having sprockets $S_1$ and $S_2$, a second sprocket subassembly 32 having sprockets $S_3$ and $S_4$. Thus, the sprockets $S_5$-$S_7$ are individual ring-shaped sprockets that are mounted directly to the rear hub 11.

As shown in FIGS. 2 and 3, the first sprocket subassembly 31 has a spider or sprocket support 34 with the sprockets $S_1$ and $S_2$ mounted thereto. The spider 34 is equipped with a boss part 34a and six sprocket support members or arms 34b which extend radially outward from the outer circumferential surface of the boss part 34a in directions substantially perpendicular to the axis X. The support arms 34b are preferably equally spaced around the axis X in a circumferential direction. The sprockets $S_1$ and $S_2$ are attached to the spider 34. Thus, the spider 34 forms a part of the mounting portions of both of the sprockets $S_1$ and $S_2$. The spider 34 is formed from a material having a specific gravity less than the sprockets $S_1$ and $S_2$.

In this embodiment, the spider 34 includes a plurality of space maintaining projections 34c extending axially towards the adjacent sprocket $S_3$. In particular, each of the space maintaining projections 34c has a free end that is axially spaced from the adjacent sprocket $S_3$ by a predetermined spacing such as 0.1 millimeters. Of course, the predetermined spacing can be more or less as needed and/or desired. If the predetermined spacing becomes too large, then the amount of deflection of the sprocket $S_2$ will become greater. Thus, it is preferably to keep the predetermined spacing as small as possible. In fact, the predetermined spacing can be zero such that the free ends of the space maintaining projections 34c contact the sprocket $S_3$. In this embodiment, the free ends of the space maintaining projections 34c are juxtaposed the rivets 44 of the second sprocket subassembly 32. The space maintaining projections 34c are located radially outwardly of the radially innermost end (the boss part 34a) of the spider 34.

Figure 4:
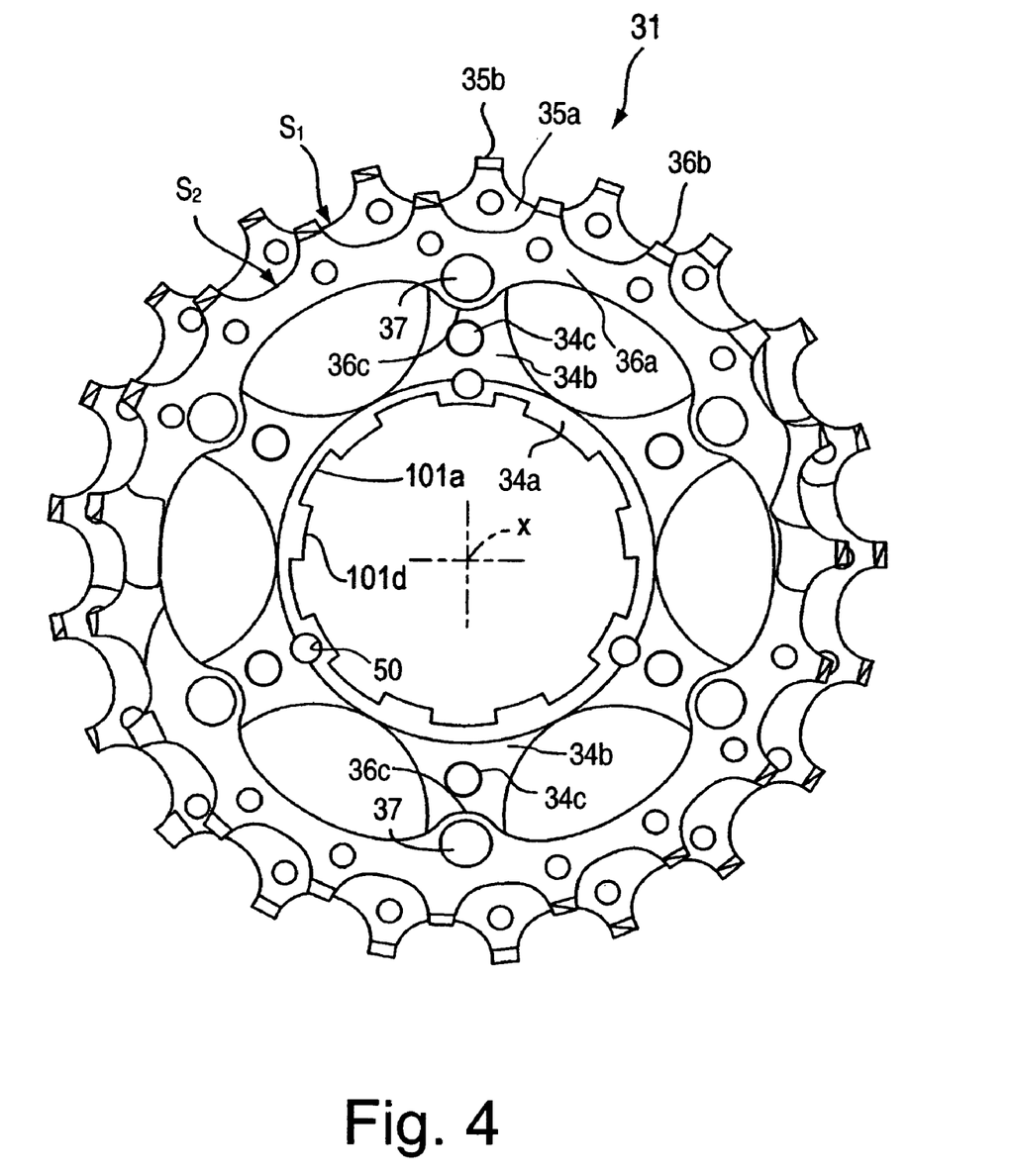
FIG. 4 is a front elevational view of the sprocket subassembly shown in FIG. 3 in accordance with the first embodiment of the present invention.
Figure 5:
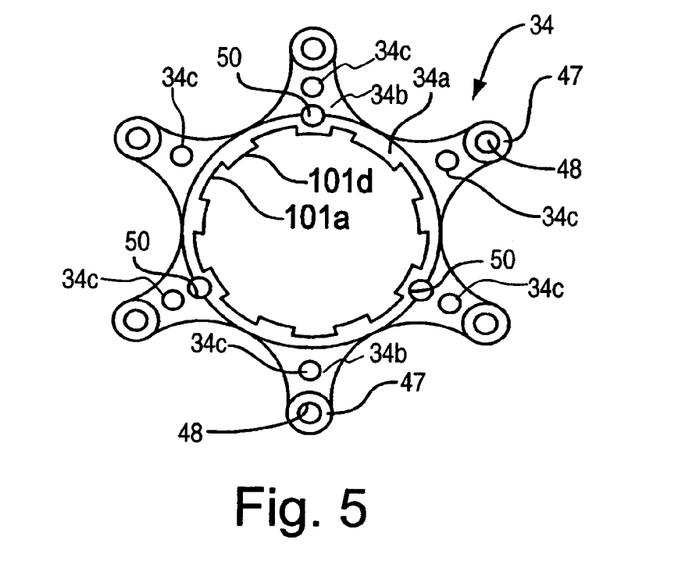
FIG. 5 is a front elevational view of the sprocket support or spider in accordance with the first embodiment of the present invention.
Figure 6:
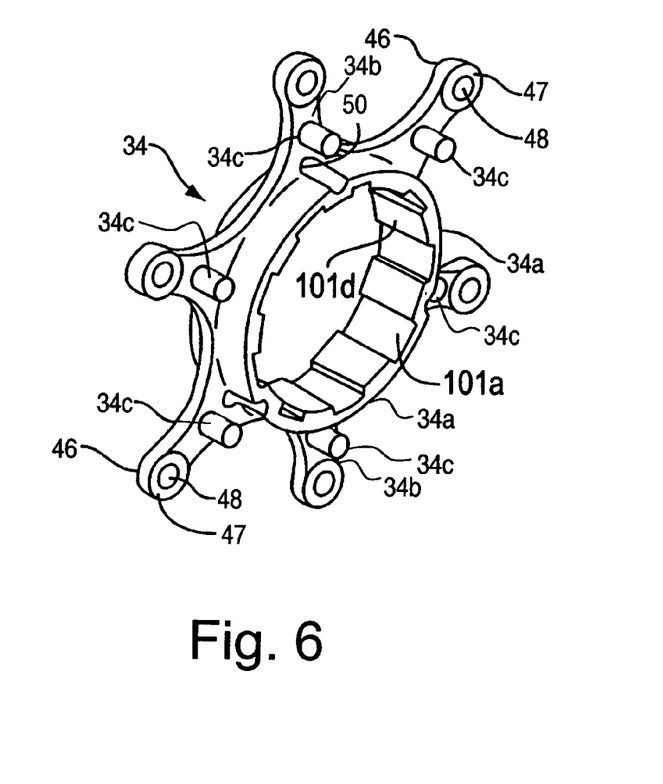
FIG. 6 is a perspective view of the sprocket support shown in FIG. 5 in accordance with the first embodiment of the present invention.

Still referring to FIGS. 3 and 4, the sprocket $S_1$ includes a chain engaging portion 35a with a plurality of teeth 35b, and an attachment portion 35c with a plurality of through holes 35d. Similarly, the sprocket $S_2$ includes a chain engaging portion 36a with a plurality of teeth 36b and an attachment portion 36c with a plurality of through holes 36d. The sprockets $S_1$ and $S_2$ are mounted to the outer ends of the sprocket support arms 34b via six fasteners or rivets 37. In this embodiment, the sprocket $S_1$ has twenty-one teeth, while the sprocket $S_2$ has nineteen teeth, so that the difference in the number of teeth between the two sprocket wheels is two teeth. As a result, the external diameters of the two sprocket wheels are not very different. Of course, it will be apparent from this disclosure that the sprockets $S_1$ and $S_2$ can have other teeth ratios as needed and/or desired. The sprockets $S_1$ and $S_2$ have substantially the same overall shape, except that the sprocket $S_2$ is smaller and has fewer teeth. Thus, the attachment portion 35c of the sprocket $S_1$ has a similar shape as the attachment portion 36c of the sprocket $S_2$.

The boss part 34a has a front end surface 42 and a rear end surface 43 which extend in a radial direction with respect to the axis X. As shown in FIG. 1, the distance between end surfaces 42 and 43, i.e., the length of the boss part 34a in the direction of the axis X, is set so that the final assembly spacing in the direction of the axis X of the adjacent sprockets mounted on the respective sprocket subassemblies is obtained by causing the rear end surface 43 of the first sprocket subassembly 31 to contact the front end surface 42 of the second sprocket subassembly 32.

Each of the outer ends of the sprocket support arms 34b has a first mounting surfaces 46 facing in a first axial direction (i.e., in directions substantially parallel to the axis X) for mounting the sprocket $S_1$, and a second mounting surface 47 facing in a second axial direction (i.e., in directions substantially parallel to the axis X) for mounting the sprocket $S_2$. These first and second mounting surfaces 46 and 47 are formed opposite each other on the front and back surfaces of the support arms 34b. Attachment holes 48 pass through the support arms 34b from the first mounting surfaces 46 to the second mounting surfaces 47. The attachment holes 48 are formed parallel to the axis X.

As shown in FIG. 3, the first and second attachment portions 35c and 36c of the sprockets $S_1$ and $S_2$ project toward the axis X and are formed on the inner circumferential surface of the first and second chain engaging portions 35a and 36a of the sprockets $S_1$ and $S_2$ to minimize the radial width of the sprockets $S_1$ and $S_2$ and thereby save weight. The through-holes 35d and 36d are formed through these attachment portions 35c and 36c, respectively. Both of the sprockets $S_1$ and $S_2$ are fastened to the mounting surfaces of the support arms 34b in a prescribed positional relationship by the rivets 37 which are passed through the through-holes 35d and 36d and the attachment holes 48 of the support arms 34b.

In the preferred embodiment, the spider 34 forms a common mounting portion, which is a separate member that is fixedly coupled to the first and second chain engaging portions 35a and 36a of the sprockets $S_1$ and $S_2$ via the attachment portions 35c and 36c of the sprockets $S_1$ and $S_2$, respectively. As mentioned above, the space maintaining projections 34c are fixed to the spider 34 that forms the common mounting portion of the sprockets $S_1$ and $S_2$. Preferably, the space maintaining projections 34c are fixed to at least some of the support arms 34b of the spider 34. More preferably, the space maintaining projections 34c are integrally formed as a one-piece, unitary member with the support arms 34b of the spider 34.

As shown in FIG. 4, the spider 34 has a plurality of holes 50. The connecting screws 29 pass through holes 50, which are formed in the boundary region between the support arms 34b and the boss part 34a, in a plurality of positions which are equally spaced in the circumferential direction. Furthermore, the boss part 34a of the spider 34 has a plurality of engaging grooves 101a and a plurality of engaging projections or splines 101d. The grooves 101a and the splines 101d extend in the axial direction, and are formed in the inner circumferential surface of the boss part 34a of the spider 34.

The preceding description has been a description of the first sprocket subassembly 31, but the second sprocket subassembly 32 has a similar configuration. The sprocket subassembly 32 differs from the first sprocket subassembly 31 in that the respective numbers of teeth of the mounted sprocket wheels are seventeen teeth and sixteen teeth, and in that the lengths of the arm parts of the spider are correspondingly shorter. Otherwise, this second sprocket subassembly 32 is substantially the same as the first sprocket subassembly 31. The second sprocket subassembly 32 has a spider 45 that is attached to the chain engaging portions of the sprockets $S_3$ and $S_4$ via the rivets 44. The boss part of the spider 45 of the second sprocket subassembly 32 has the engaging grooves 101a and the engaging splines 101d which extend in the axial direction and are formed in the inner circumferential surface of the boss part. Also the boss part of the spider 45 of the second sprocket subassembly 32 has holes through which the connecting screws 29 pass. Accordingly, in view of the similarity between the first and second sprocket subassemblies 31 and 32 further description of the sprocket subassembly 32 will be omitted. Rather, the description of the first sprocket subassembly 31 applies to the second sprocket subassembly 32 unless otherwise indicated.

As shown in FIG. 2, the rear hub 11 is fastened to the bicycle frame 14 through a quick-release mechanism 91. A one-way clutch mechanism 92 having an outer race 92a, an inner race 92b and a plurality of one-way pawls 92c are installed on one end of the rear hub 11. The engaging grooves 92d which extend along the axis X of the rear axle are formed on the outer circumferential surface of the outer race 92a. The rear sprocket assembly 12 is mounted on the outer race 92a so that the rear sprocket assembly 12 is fit into the engaging grooves 92d, and the movement of sprocket assembly 12 in the axial direction is checked by a ring stopper 93. In order to prevent relative rotation between the rear sprocket assembly 12 and the outer race 92a, the outer surface of the outer race 92a has a plurality of splines 101 that mate with the splines 101d that are formed on the inner circumferential surface of sprocket assembly 12.

Figure 9:
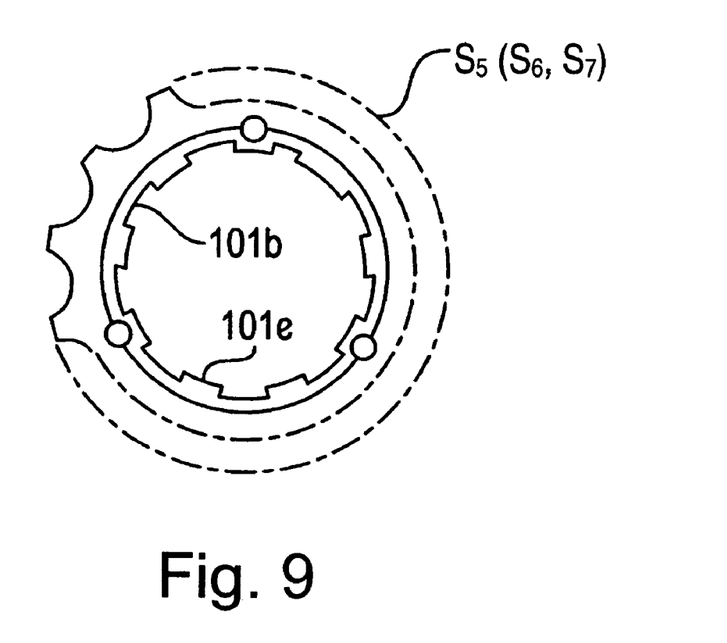
FIG. 9 is a front elevational view of one of the ring-shaped sprockets shown in FIG. 5 in accordance with the first embodiment of the present invention.

FIG. 9 shows the fifth, sixth and seventh annular plate-shaped sprockets $S_5$-$S_7$. In this embodiment, the respective numbers of teeth of these sprocket wheels are fifteen teeth, fourteen teeth and thirteen teeth. The first, second and third annular plate-shaped sprockets $S_5$-$S_7$ are each provided with a plurality of engaging grooves 101b and a plurality of engaging projections or splines 101e which extend in the axial direction, and which are formed on the inner circumferential surfaces of the sprockets. The fifth, sixth and seventh annular plate-shaped sprockets $S_5$-$S_7$ are each provided with three holes through which the connecting screws 29 are passed.

Figure 10:
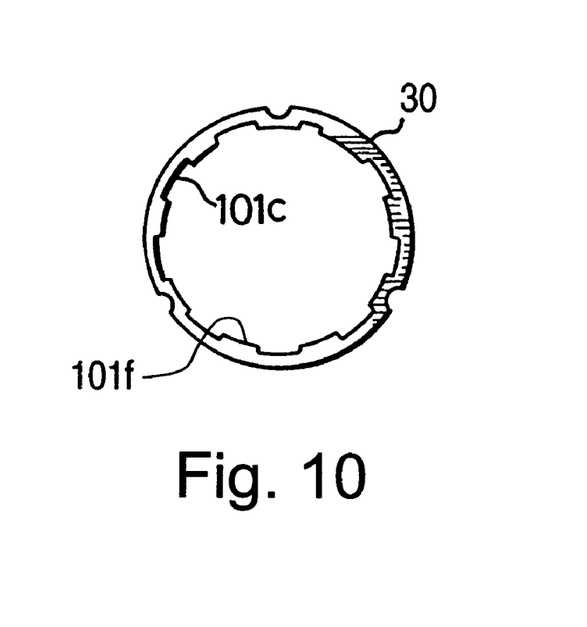
FIG. 10 is a front elevational view of the spacer shown in FIG. 5 in accordance with the first embodiment of the present invention.

FIG. 10 illustrates one of the ring-shaped spacers 30. The ring-shaped spacers 30 are each provided with a plurality of engaging grooves 101c and a plurality of engaging projections or splines 101f which extend in the axial direction and which are formed in the inner circumferential surface of the ring-shaped spacer 30. The ring-shaped spacers 30 are each provided with a plurality of recesses through which the connecting screws 29 are passed. The thickness of each ring-shaped spacer 30 is set so that the final assembly spacing of the adjacent sprocket wheels in the direction of the axis X is obtained.

As shown in FIG. 2, when the first sprocket subassembly 31, the second sprocket subassembly 32, the sprockets $S_5$-$S_7$ and the spacers 30 are formed into an integral unit by the connecting screws 29, the engaging grooves 101a, 101b and 101c and the engaging projections 101d, 101e and 101f formed in the inner circumferential surfaces of the respective components constitute an overall set of engaging grooves and projections, which engages with the engaging recesses 92d formed in the freewheel 13 of the rear hub 11. Of course, it will be apparent to those skilled in the art from this disclosure that the connecting screws 29 and the corresponding holes can be omitted if needed and or desired. In other words, the rear sprocket assembly 12 does not need to be an integral unit. Rather, the first and second sprocket subassemblies 31 and 32, the sprockets $S_5$-$S_7$ and the spacers 30 can be separately mounted to the freewheel 13 of the rear hub 11.

Second Embodiment

Figure 11:
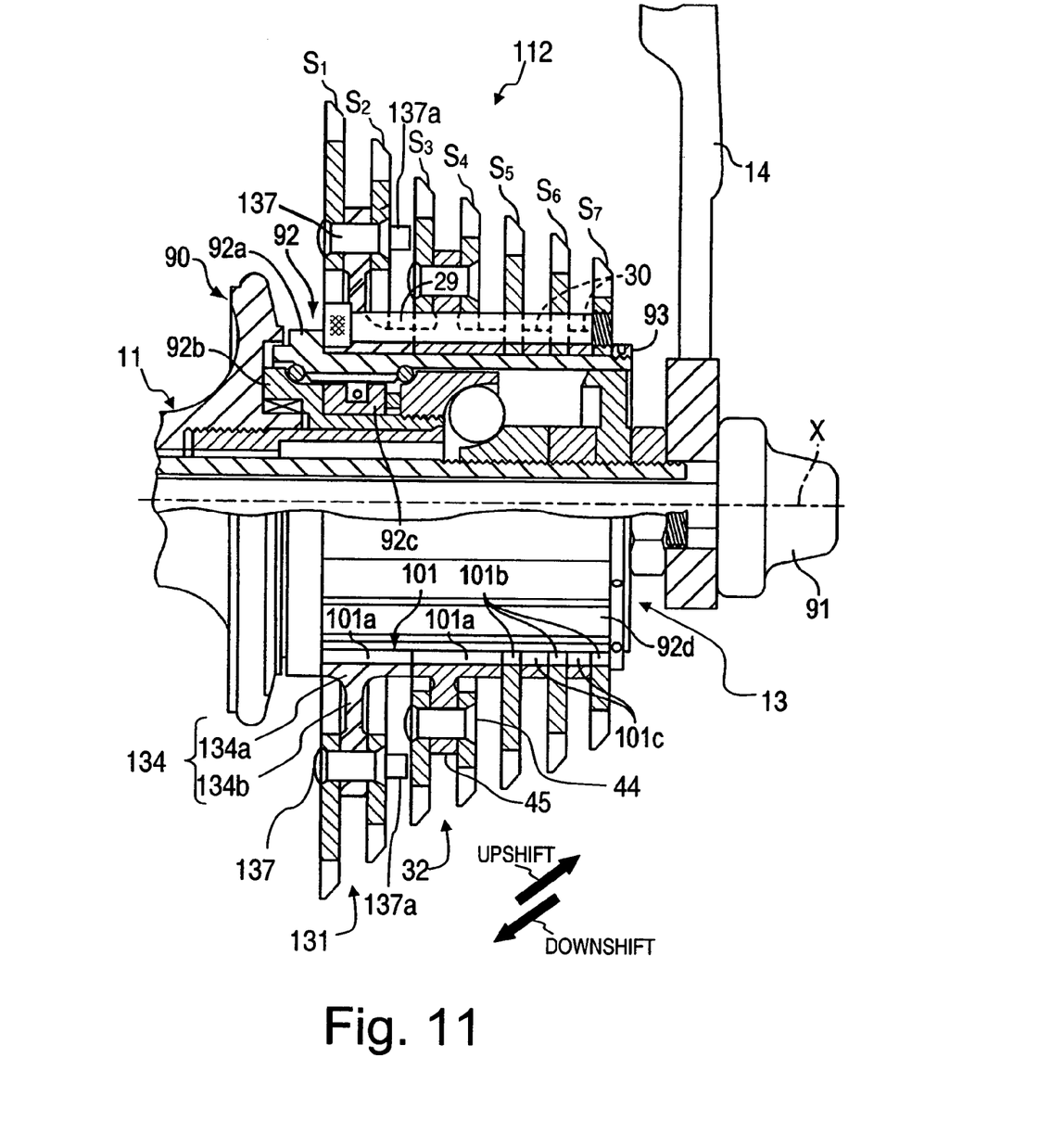
FIG. 11 is a partial cross-sectional view of the rear hub with a multiple sprocket assembly in accordance with a second embodiment of the present invention.

Referring now to FIG. 11, a modified first sprocket subassembly 131 in accordance with a second embodiment will now be explained. The first sprocket subassembly 131 replaces the first sprocket subassembly 31 of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIG. 11, the first sprocket subassembly 131 has a spider-type sprocket support 134 with the sprockets $S_1$' and $S_2$' mounted thereto. The spider 134 is equipped with a boss part 134a and six sprocket support members or arms 134b which extend radially outward from the outer circumferential surface of the boss part 134a in directions substantially perpendicular to the axis X. The sprockets $S_1$' and $S_2$' are attached to the spider 134. Thus, the spider 134 forms a part of the mounting portions of both of the sprockets $S_1$' and $S_2$'. The spider 134 is formed from a material having a specific gravity less than the sprockets $S_1$' and $S_2$'. In this second embodiment, the first sprocket subassembly 131 has a plurality of rivets 137 with space maintaining projections 137a that extend axially towards an adjacent one of the sprockets. In a preferred embodiment, a predetermined axial space exists between a free end of each of the space maintaining projections 137a and the adjacent one of the sprockets. Basically, the spider 134 is identical to the spider 34, except that the support arms 134b are shorter so that the space maintaining projections 137a does not interfere with the chain 23. Also, the sprockets $S_1$' and $S_2$' are identical to the sprockets $S_1$ and $S_2$, except that locations of the through holes for the rivets 137 has been moved radially inward towards axis X so that the space maintaining projections 137a does not interfere with the chain 23.

In understanding the scope of the present invention, as discussed above, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle sprocket assembly comprising:
    a first sprocket assembly including
        a first mounting portion with a first radially innermost end having a first splined inner bore for mounting on a freewheel of a bicycle hub, and
        a first chain engaging portion with a plurality of first teeth; and
    a second sprocket assembly including
        a second mounting portion with a second radially innermost end having a second splined inner bore for mounting on the freewheel of the bicycle hub, and
        a second chain engaging portion with a plurality of second teeth that are fewer in total number than a total number of the first teeth of the first sprocket assembly,
    at least one of the first and second mounting portions having a plurality of space maintaining projections extending axially towards but axially spaced apart from an adjacent one of the first and second sprocket assemblies with at least some of the space maintaining projections having free ends that are axially spaced from the adjacent one of the first and second sprocket assemblies by a predetermined distance that is less than half the distance between opposing axial faces of the adjacent sprocket assembly and the one of the first and second sprocket assemblies to which the one of the first and second mounting portions having the space maintaining projections is attached to limit relative deflection between the first and second sprocket assemblies, with the space maintaining projections being located radially outward of the first and second splined inner bores of the first and second radially innermost ends of the first and second mounting portions of the first and second sprocket assemblies with the bicycle sprocket assembly assembled.

2. The bicycle sprocket assembly according to claim 1, wherein
the first mounting portion of the first sprocket assembly is a sprocket support member separate from a first sprocket having the first chain engaging portion.

3. The bicycle sprocket assembly according to claim 2, wherein
at least some of the space maintaining projections are fixed to the sprocket support member.

4. The bicycle sprocket assembly according to claim 2, wherein
the sprocket support member includes a boss with the first splined inner bore and a plurality of support arms extending radially from the boss, with the first chain engaging portion being fixed to the support arms.

5. The bicycle sprocket assembly according to claim 4, wherein
at least some of the space maintaining projections are fixed to at least some of the support arms of the sprocket support member.

6. The bicycle sprocket assembly according to claim 5, further comprising
a third sprocket assembly fixed to the support arms of the sprocket support member, the third sprocket assembly including a third chain engaging portion with a plurality of third teeth that are greater in total number than the total number of the first teeth of the first sprocket assembly.

7. The bicycle sprocket assembly according to claim 6, wherein
the first sprocket assembly is fixed to an axial mounting surface of the support arms of the sprocket support member adjacent to the second sprocket assembly and the third sprocket assembly is fixed to an opposite axial mounting surface of the support arms of the sprocket support member.

8. The bicycle sprocket assembly according to claim 1, wherein
the first mounting portion of the first sprocket assembly is a sprocket support member fixed to a first sprocket by a plurality of fasteners, with the sprocket support member including at least some of the space maintaining projections.

9. The bicycle sprocket assembly according to claim 1, wherein
the first mounting portion is a sprocket support member that is formed from a material having a specific gravity less than the first and second chain engaging portions.

10. The bicycle sprocket assembly according to claim 9, wherein
the space maintaining projections are integrally formed as a one-piece, unitary member with the sprocket support member.

11. A bicycle sprocket assembly comprising:
a first sprocket assembly including a first mounting portion with a first radially innermost end, and a first chain engaging portion with a plurality of first teeth, the first mounting portion being a sprocket support member having a boss and a plurality of support arms extending radially from the boss, the first chain engaging portion being defined on a separate first sprocket that is fixed to the support arms, the boss being configured for installation on a freewheel of a bicycle hub; and
a second sprocket assembly including a second mounting portion with a second radially innermost end, and a second chain engaging portion with a plurality of second teeth that are fewer in total number than a total number of the first teeth of the first sprocket assembly,
at least one of the first and second mounting portions having a plurality of space maintaining projections integrally formed as a one piece, unitary member with the sprocket support member extending axially towards but axially spaced apart from an adjacent one of the first and second sprocket assemblies with at least some of the space maintaining projections having free ends that are axially spaced from the adjacent one of the first and second sprocket assemblies to limit relative deflection between the first and second sprocket assemblies, with the space maintaining projections being located radially outward of the first and second radially innermost ends of the first and second mounting portions of the first and second sprocket assemblies with the bicycle sprocket assembly assembled.

12. The bicycle sprocket assembly according to claim 11, wherein
at least some of the space maintaining projections are fixed to at least some of the support arms of the sprocket support member.

13. The bicycle sprocket assembly according to claim 1, wherein
the first mounting portion of the first sprocket assembly is a sprocket support member fixed to a first sprocket that includes the first chain engaging portion by a plurality of fasteners, with at least some of the space maintaining projections formed on the fasteners.

14. The bicycle sprocket assembly according to claim 13, wherein
the sprocket support member includes a boss and a plurality of support arms extending radially from the boss, with the first sprocket being fixed to the support arms.

15. The bicycle sprocket assembly according to claim 14, further comprising
a third sprocket assembly fixed to the support arms of the sprocket support member, the third sprocket assembly including a third chain engaging portion with a plurality of third teeth that are greater in total number than the total number of the first teeth of the first chain engaging portion of the first sprocket assembly.

16. The bicycle sprocket assembly according to claim 15, wherein
the first sprocket assembly is fixed to an axial mounting surface of the support arms of the sprocket support member adjacent to the second sprocket assembly and the third sprocket assembly is fixed to an opposite axial mounting surface of the support arms of the sprocket support member.

17. The bicycle sprocket assembly according to claim 13, wherein
the sprocket support member is formed from a material having a specific gravity less than the first and second chain engaging portions.

18. A bicycle sprocket assembly comprising:
a first sprocket assembly including
a first mounting portion with a first radially innermost end having a first splined inner bore for mounting on a freewheel of a bicycle hub, and
a first chain engaging portion with a plurality of first teeth; and
a second sprocket assembly including
a second mounting portion with a second radially innermost end having a second splined inner bore for mounting on the freewheel of the bicycle hub, and
a second chain engaging portion with a plurality of second teeth that are fewer in total number than a total number of the first teeth of the first sprocket assembly,
a plurality of space maintaining projections disposed between the first and second sprocket assemblies to limit relative deflection between the first and second sprocket assemblies, the space maintaining projections being located radially outward of the first and second splined inner bores of the first and second radially innermost ends of the first and second mounting portions of the first and second sprocket assemblies such that a radial gap exists along a radial line extending between each of the space maintaining projections and the first and second radially innermost ends of the first and second mounting portions of the first and second sprocket assemblies, the space maintaining projections being fixed relative to one of the first and second sprocket assemblies, the space maintaining projections having free ends that extend axially from the one of the first and second sprocket assemblies and are spaced apart from the other of the first and second sprocket assemblies by a predetermined distance that is less than half the distance between opposing axial faces of the one sprocket assembly and the other sprocket assembly with the bicycle sprocket assembly assembled with the first and second sprockets assemblies adjacent to one another.

19. The bicycle sprocket assembly according to claim 1, wherein
the first sprocket assembly includes a first sprocket having a first attachment portion having a first radially inner end, the first attachment portion being fixed to the first mounting portion,
the second sprocket assembly includes a second sprocket having a second attachment portion having a second radially inner end, the second attachment portion being fixed to the first mounting portion, and
the plurality of space maintaining projections are located radially outward from the second radially inner end of the second attachment portion of the second sprocket.

20. A bicycle sprocket assembly comprising:
a first sprocket assembly including
a first sprocket and a first mounting portion, the first sprocket having a first attachment portion with a first radially inner end and
a first chain engaging portion with a plurality of first teeth, the first mounting portion having a first radially innermost end with a first splined inner bore for mounting on a freewheel of a bicycle hub, and the first radially inner end of the first attachment portion being fixed to the first mounting portion; and
a second sprocket assembly including
a second sprocket and a second mounting portion, the second sprocket having a second attachment portion with a second radially inner end and
a second chain engaging portion with a plurality of second teeth, the second mounting portion having a second radially innermost end with a second splined inner bore for mounting on the freewheel of the bicycle hub, with the second radially inner end of the second attachment portion being fixed to the second mounting portion,
at least one of the first and second mounting portions having a plurality of space maintaining projections extending axially towards an adjacent one of the first and second sprocket assemblies and being axially spaced from the adjacent sprocket assembly by a predetermined distance that is less than half the distance between opposing axial faces of the adjacent sprocket assembly and the one of the first and second sprocket assemblies to which the one of the first and second mounting portions having the plurality of space maintaining projections is attached to limit relative deflection between the first and second sprocket assemblies, with the space maintaining projections being located radially outward of the first and second radially innermost ends of the first and second mounting portions of the first and second sprocket assemblies, where the plurality of space maintaining projections are located radially outward from the second radially inner end of the second attachment portion of the second sprocket and the plurality of space maintaining projections are located radially outward of the first and second splined inner bores from the first radially inner end of the first attachment portion of the first sprocket.

21. A bicycle sprocket assembly comprising:
a first sprocket assembly including
a first mounting portion with a first radially innermost end,
a first chain engaging portion with a plurality of first teeth, and
a first sprocket having a first attachment portion having a first radially inner end, the first attachment portion being fixed to the first mounting portion; and
a second sprocket assembly including
a second mounting portion with a second radially innermost end,
a second chain engaging portion with a plurality of second teeth that are fewer in total number than a total number of the first teeth of the first sprocket assembly, and
a second sprocket having a second attachment portion having a second radially inner end, the second attachment portion being fixed to the first mounting portion,
at least one of the first and second mounting portions having a plurality of space maintaining projections extending axially towards but axially spaced apart from an adjacent one of the first and second sprocket assemblies with at least some of the space maintaining projections having free ends that are axially spaced from the adjacent one of the first and second sprocket assemblies to limit relative deflection between the first and second sprocket assemblies, with the space maintaining projections being located radially outward of the first and second radially innermost ends of the first and second mounting portions of the first and second sprocket assemblies, radially outward from the second radially inner end of the second attachment portion of the second sprocket, and radially inward from the first radially inner end of the first attachment portion of the first sprocket with the bicycle sprocket assembly assembled.

* * * * *